(12) United States Patent
Sampathkumar

(10) Patent No.: US 6,950,855 B2
(45) Date of Patent: Sep. 27, 2005

(54) MASTER NODE SELECTION IN CLUSTERED NODE CONFIGURATIONS

(75) Inventor: Govindaraj Sampathkumar, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 10/052,551

(22) Filed: Jan. 18, 2002

(65) Prior Publication Data

US 2003/0140108 A1 Jul. 24, 2003

(51) Int. Cl.⁷ .................. G06F 15/16; G06F 15/177
(52) U.S. Cl. .................. 709/209; 709/208; 709/221
(58) Field of Search .................. 709/208, 209, 709/223, 221; 370/254, 901–911

(56) References Cited

U.S. PATENT DOCUMENTS

| | | | |
|---|---|---|---|
| 5,539,883 A | 7/1996 | Allon et al. | 395/200.11 |
| 5,612,897 A | 3/1997 | Rege | 364/514 |
| 5,748,958 A * | 5/1998 | Badovinatz et al. | 718/100 |
| 6,070,191 A | 5/2000 | Narendran et al. | 709/226 |
| 6,104,871 A * | 8/2000 | Badovinatz et al. | 718/100 |
| 6,119,143 A | 9/2000 | Dias et al. | 709/201 |
| 6,173,311 B1 | 1/2001 | Hassett et al. | 709/202 |
| 6,196,580 B1 | 2/2001 | Goldszmidt et al. | 709/203 |
| 6,226,640 B1 * | 5/2001 | Ostrovsky et al. | 707/5 |
| 6,236,999 B1 | 5/2001 | Jacobs et al. | 707/10 |
| 6,253,230 B1 | 6/2001 | Couland et al. | 709/203 |
| 6,449,641 B1 * | 9/2002 | Moiin et al. | 709/220 |
| 6,662,219 B1 * | 12/2003 | Nishanov et al. | 709/220 |
| 6,839,752 B1 * | 1/2005 | Miller et al. | 709/224 |
| 2003/0018735 A1 * | 1/2003 | Fujii et al. | 709/209 |
| 2003/0041138 A1 * | 2/2003 | Kampe et al. | 709/223 |
| 2003/0212777 A1 * | 11/2003 | Kandefer et al. | 709/223 |

FOREIGN PATENT DOCUMENTS

| | | |
|---|---|---|
| WO | WO 9926235 A2 * | 5/1999 |
| WO | WO 99/33227 A1 | 7/1999 |
| WO | WO 00/08823 A1 | 2/2000 |
| WO | WO 00/22712 A1 | 4/2000 |
| WO | WO 00/62502 A2 | 10/2000 |
| WO | EP 1 049 307 A1 | 11/2000 |
| WO | WO 01/13228 A2 | 2/2001 |

OTHER PUBLICATIONS

Terwari, Dias, Mukherjee; High Availability in Clustered Multimedia Servers; 1996 IEEE, pp. 645–654.*

IBM Technical Disclosure Bulletin, vol. 39, No. 08, Aug. 1996, pp. 195–196.

IBM Technical Disclosure Bulletin, vol. 40, No. 12, Dec. 1997, pp. 5–8.

* cited by examiner

Primary Examiner—Larry D. Donaghue
Assistant Examiner—Ramsey Refai
(74) Attorney, Agent, or Firm—Ido Tuchman; Randall J. Bluestone

(57) ABSTRACT

A method and system for selecting master nodes to manage a target node group in a computer network having multiple nodes and overlapping node groups. The system includes determining a hamming distance for node pairs within the network. The node pair includes two node pair members and the hamming distance is the number of node groups the node pair members do not share in common. A participation index for nodes within the network is determined at a determining operation. The participation index is the number of node groups the node belongs to. An availability potential for node pairs is also determined. The availability potential is the sum of the participation indexes of the node pair members subtracted by the hamming distance of the node pair. An optimal combination of node pairs is found by searching for the maximum total availability potential for the network. A master node pair for the target node group is selected from the optimal combination of node pairs. If a master node pair does not exist for the target node group, a master node belonging to the target node group is selected for the target group.

29 Claims, 6 Drawing Sheets

| P | n1 | n2 | n3 | n4 | n5 |
|---|----|----|----|----|----|
| n1 | 3 | 2 | 4 | 4 | 4 |
| n2 | 2 | 2 | 4 | 4 | 2 |
| n3 | 4 | 4 | 4 | 8 | 6 |
| n4 | 4 | 4 | 8 | 4 | 6 |
| n5 | 4 | 2 | 6 | 6 | 4 |

| LBG-A | (n1, n5) | (n3, n4) |    |
|-------|----------|----------|----|
| LBG-B | (n3, n4) | n2       | n5 |
| LBG-C | (n3, n4) | n2       | n1 |
| LBG-D | (n1, n5) |          |    |
| LBG-E | (n3, n4) | n5       |    |

*Fig. 4E*

MASTER NODE SELECTION IN CLUSTERED NODE CONFIGURATIONS

FIELD OF THE INVENTION

The present invention relates generally to computer networks, and more specifically to load balancing in network clustering environments.

BACKGROUND

As some Internet sites become popular, they may reach a point when a single server may be insufficient to keep up with the load on their system. One solution to such a situation is to combine several servers, also referred to as nodes, into a node group. To clients, the node group, also referred to as a load balancing group, still appears as a single server. Internally, however, workload reaching the node group is distributed evenly among the node group members so that no one node is overwhelmed.

In some network configurations several node groups are created to handle different resources in the system. For example, one node group may be responsible for transferring data files while another node group may handle a site's e-mail service. In addition, some nodes in the network may belong to several node groups, thereby creating overlapping node groups. Although such flexible node group configurations are beneficial because they allow highly efficient resource allocation, they can be difficult to administer.

A network administrator typically configures at least one node in a node group to be a master node, also referred to herein as an lbnode. In general, the master node takes ownership of the node group and is responsible for allocating tasks among the node group members. Thus, in addition to performing the same duties as the other nodes in the node group, the master node is responsible for distributing work among the node group members.

Generally, the master node is manually selected by a network administer. Although the network administrator may use any criteria to select a master node, master nodes are typically selected based on high availability. High availability refers to a node's capacity to provide continuous access to network resources, even when serious network failures occur. Thus, the network administrator is often faced with the task of finding the most highly available node in the node group to select as the group's master node. Finding the most highly available nodes in possibly overlapping node groups may be a difficult undertaking and may require the network administrator to use time-consuming trial and error techniques.

Another method of increasing the availability of a node group is to elect a primary master node and secondary master node, also referred to as a primary lbnode and a secondary lbnode, for the node group. The primary master node actively handles load balancing for the node group, while the secondary master node servers as a backup master node ready to takeover load balancing if the primary master node fails. Creating a master node pair adds redundancy to the node group and, hence, increases the node group's availability. However, adding a secondary master node further complicates matters by requiring the network administrator to now find two nodes in the node group to act as lbnodes. Generally, the primary and secondary lbnodes must still be chosen for maximum availability within a network of possibly overlapping node groups.

SUMMARY OF THE INVENTION

The present invention addresses the above-identified problems with the prior art by providing a method for selecting master nodes to manage a target node group in a computer network having multiple nodes and node groups.

The method includes a determining operation to determine a hamming distance for node pairs within the network. Each node pair includes two node pair members and the hamming distance of the node pair is the number of node groups the node pair members do not share in common. Another determining operation is used to determine a participation index for nodes within the network. The participation index is the number of node groups the node belongs to. An availability potential for the node pairs is also determined. The availability potential is the sum of the participation indexes of the node pair members subtracted by the hamming distance of the node pair. An optimal combination of node pairs is found by locating the combination of node pairs with the maximum total availability potential for the network. A selecting operation selects a master node pair from the optimal combination of node pairs, with the master node pair having both node pair members belonging to the target node group. If a master node pair does not exist for the target node group, a node belonging to the target node group is selected as the master node for the target node group.

Another aspect of the invention is a data structure for use in selecting master nodes to manage a target node group in a computer network. The data structure includes a hamming distance array containing, for node pairs in the network, the number of node groups the node pair members do not share in common. In addition, the data structure includes a participation index array containing, for nodes in the network, the number of node groups the node belongs to. Furthermore, the data structure includes an availability potential array containing, for node pairs in the network, the sum of the participation indexes of the node pair members subtracted by the hamming distance of the node pair.

Yet another aspect of the invention is a computer program product embodied in a tangible media. The computer program product includes computer readable program codes coupled to the tangible media for selecting master nodes to manage a target node group in a computer network having multiple nodes and node groups. The computer readable program codes include program code configured to determine a hamming distance for node pairs within the network. The hamming distance, as discussed above, is the number of node groups the node pair members do not share in common. Another program code is configured to determine a participation index for nodes within the network, the participation index being the number of node groups the node belongs to. Another program code is configured to determine an availability potential for node pairs, the availability potential being the sum of the participation indexes of the node pair members subtracted by the hamming distance of the node pair. The program is then caused to find an optimal combination of node pairs, wherein the optimal combination of node pairs has the maximum total availability potential for the network. Another program code is configured to select a master node pair for the target node group. The master node pair is the node pair from the optimal combination of node pairs having both node pair members belonging to the target node group. If a master node pair does not exist for the target node group, a program code is configured to select a master node for the target node group, the master node being the node belonging to the target node group.

Another aspect of the invention is a system for selecting master nodes to manage a target node group in a computer network having multiple nodes and node groups. The system includes a hamming distance module for determining a hamming distance of node pairs within the network. A participation index module is used to determine a participation index of nodes within the network. An availability potential module determines the availability potential of the node pairs and a search module finds the optimal combination of node pairs. A first selection module selects a master node pair of the target node group, and, if a master node pair does not exist for the target node group, a second selection module for selects a master node for the target node group.

Another aspect of the invention is a method for selecting master nodes to manage a target node group in a computer network having multiple nodes and node groups. The method includes a determining operation to determine a hamming distance for node pairs within the network. Each node pair includes two node pair members and the hamming distance of the node pair is the number of node groups the node pair members do not share in common. An optimal combination of node pairs is found by locating the combination of node pairs with a minimum total hamming distance for the network. A selecting operation selects a master node pair from the optimal combination of node pairs, with the master node pair having both node pair members belonging to the target node group. If a master node pair does not exist for the target node group, a node belonging to the target node group is selected as the master node for the target node group.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 4D shows a potential availability array.

FIG. 4E shows a preferred order array.

DETAILED DESCRIPTION OF THE INVENTION

Figure 1:
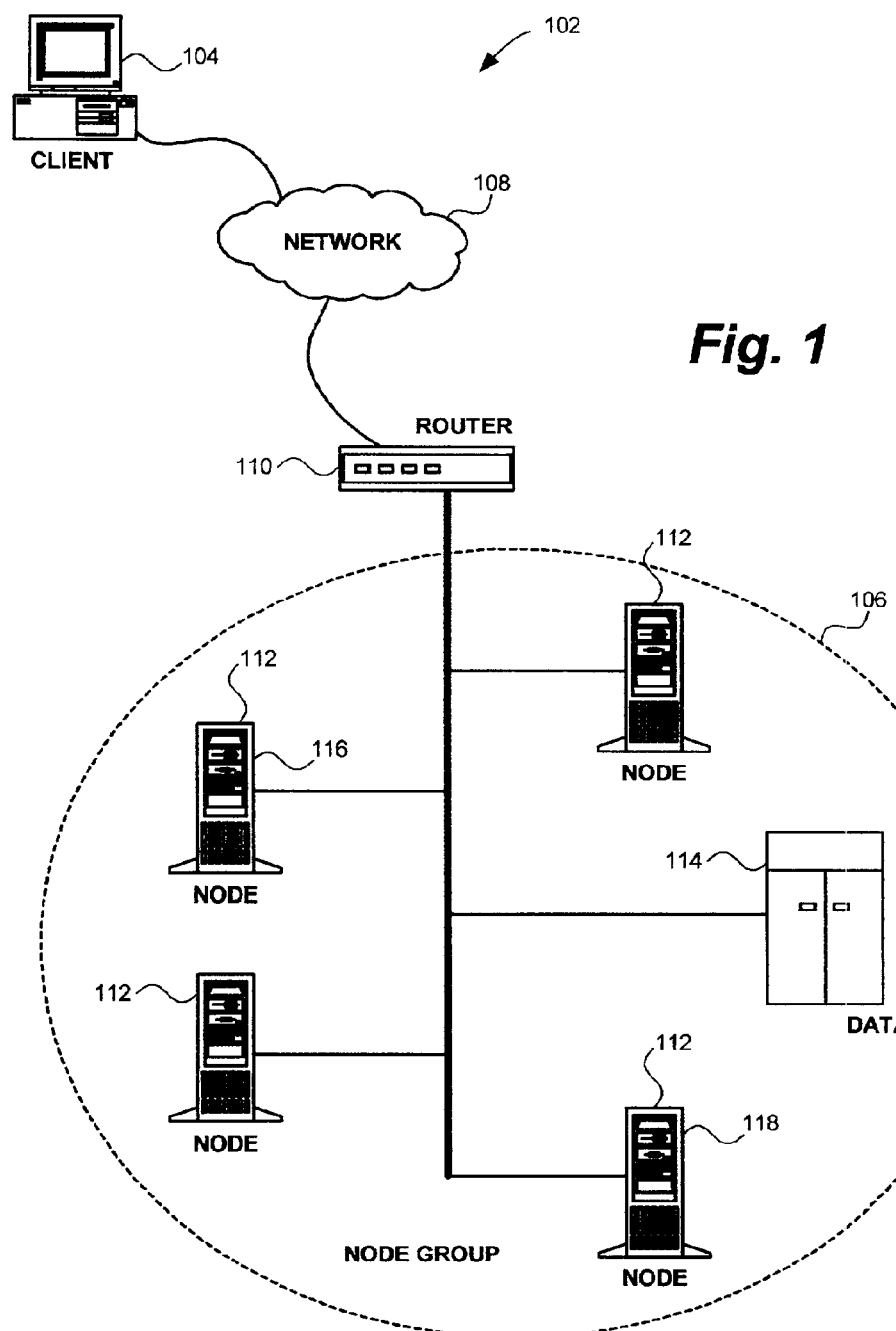
FIG. 1 shows an exemplary computer network environment embodying the present invention.

In general, the present invention is used to automatically select master nodes such that optimal availability of the node group is achieved. The invention is described in detail below with reference to FIGS. 1–4E. When referring to the figures, like structures and elements shown throughout are indicated with like reference numerals.

In FIG. 1, an exemplary computer network environment 102 embodying the present invention is shown. A client 104 is pictured communicating to a node group 106 through a wide area network (WAN) 108. The communication path between the client 104 and the node group 106 may include various networking devices known to those in art. For example, a router 110 may be used to direct messages from the client 104 to the node group 106.

The node group 106 is comprised of several nodes 112 sharing at least one common network resource 114, such as data. One node in the node group 106 is selected to be a master node 116, also referred to herein as the primary lbnode. The master node 116 typically keeps track of each node's availability and load, and forwards new client session requests to nodes 112 with spare capacity. In this manner, the master node 116 acts as a load balancer by dispatching incoming connections and packets to those nodes 112 within the node group 106 that can take on the work.

The node group 106 may also include a second master node 118, also referred to herein as the secondary lbnode or backup master node. Both the primary lbnode 116 and the secondary lbnode 118 are referred to herein as a master node pair or lbnodes. The first and second master nodes 116 and 118 continuously monitor each other's status, known as heartbeating, so that if the first master node 116 fails, the second master node 118 can take ownership of the node group. This adds redundancy to the system and helps preserve client sessions in case one of the lbnodes malfunctions.

In one configuration of the present invention, the lbnodes utilize IBM's Network Dispatcher as a network load balancer. IBM is a registered trademark of International Business Machines Corporation. The Network Dispatcher provides high availability under extreme loads by linking many individual nodes into a single logical Network Attached Server. In addition, the Network Dispatcher keeps track of each node's availability and load, allowing the master node to forward new session requests to nodes with spare capacity. It is further contemplated that the present invention may be used with other network load balancers operating in an active-backup lbnode paradigm, such as the Linux Virtual Server, various custom load balancing switches, and other node clustering environments.

Figure 2:
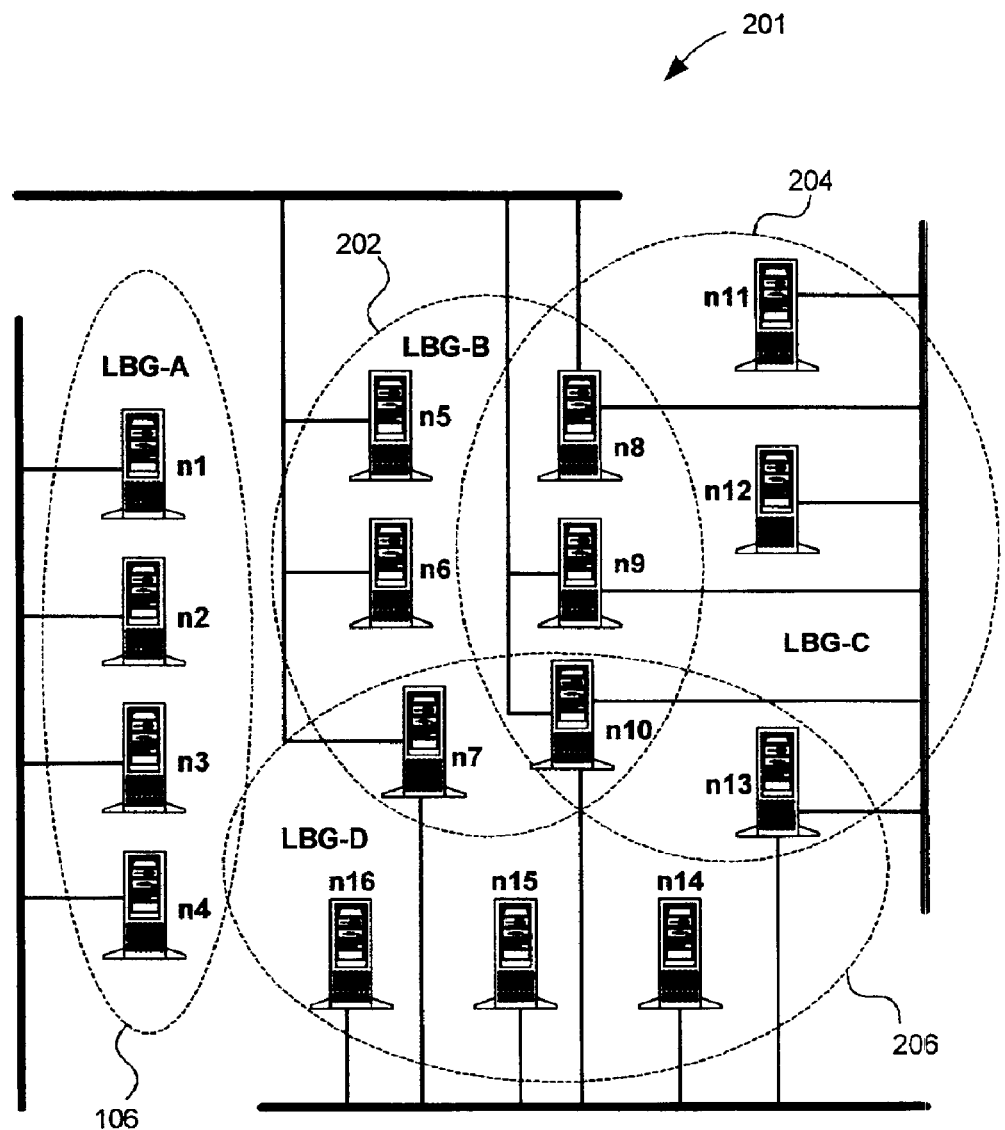
FIG. 2 shows a computer network embodying the present invention divided into several node groups.

In FIG. 2, a computer network 201 embodying the present invention is shown divided into several node groups 106, 202, 204, and 206. Such an arrangement is representative of a network site configured to handle high volumes of network traffic. It should be observed that some nodes in the network belong to two or more node groups, thereby creating overlapping node groups. Thus, the present invention allows for arbitrary groupings of nodes into node groups, provided, of course, that each node group member be given access to the network resources the node group is servicing.

As detailed below, one embodiment of the present invention is a system for automatically selecting lbnodes to manage node groups in a computer network. The lbnodes are selected to optimize the network's availability and session preservation in case of lbnode failure. The invention therefore beneficially frees the network administrator from finding the best master node to manage each node group in the network.

In general, the optimal deployment strategy for lbnodes is defined as follows: Given a set of nodes $N=\{N_1, N_2, \ldots N_n\}$ and a set of possibly overlapping groupings of nodes in sets $G_1, G_2, \ldots G_m$, such that $G_i=\{N_p, N_q, \ldots\}$, where $N_p$, $N_q$, ... belong to set N, then the requirement is to elect a master node pair for every $G_i$ such that:

1. one master node pair member is designated the primary master node (primary lbnode) and the other master node pair member is designated the backup master node (secondary lbnode); and 2. if two nodes $N_p$ and $N_q$ are elected to be masters of group $G_i$, then neither $N_p$ nor $N_q$ can be a master node of a different node group $G_j$ with a third node $N_r$.

If the maximum number of groups in the network contain master nodes satisfying the above conditions, then an optimal deployment strategy has been generated. Furthermore, those groups satisfying the above conditions achieve high availability. It should be noted that in some network configurations it may be impossible to achieve high availability for every group. For those groups that cannot achieve high availability, the election algorithm of the present invention selects one of the group member nodes to be the master node.

In one embodiment of the invention, the algorithm also adheres to the following weak requirement: the master node roles for groups $G_1, G_2, \ldots G_m$ are distributed as much as possible among the nodes in the set N. In other words, if there are m groups and n>m nodes, and if permitted by configuration, none of the n nodes are masters for two different groups. Such a deployment strategy is desirable because it distributes the ingress points in the network across the different nodes of the system, effectively increasing the available inbound bandwidth, and thereby distributing the load balancing traffic across the nodes.

Figure 3A:
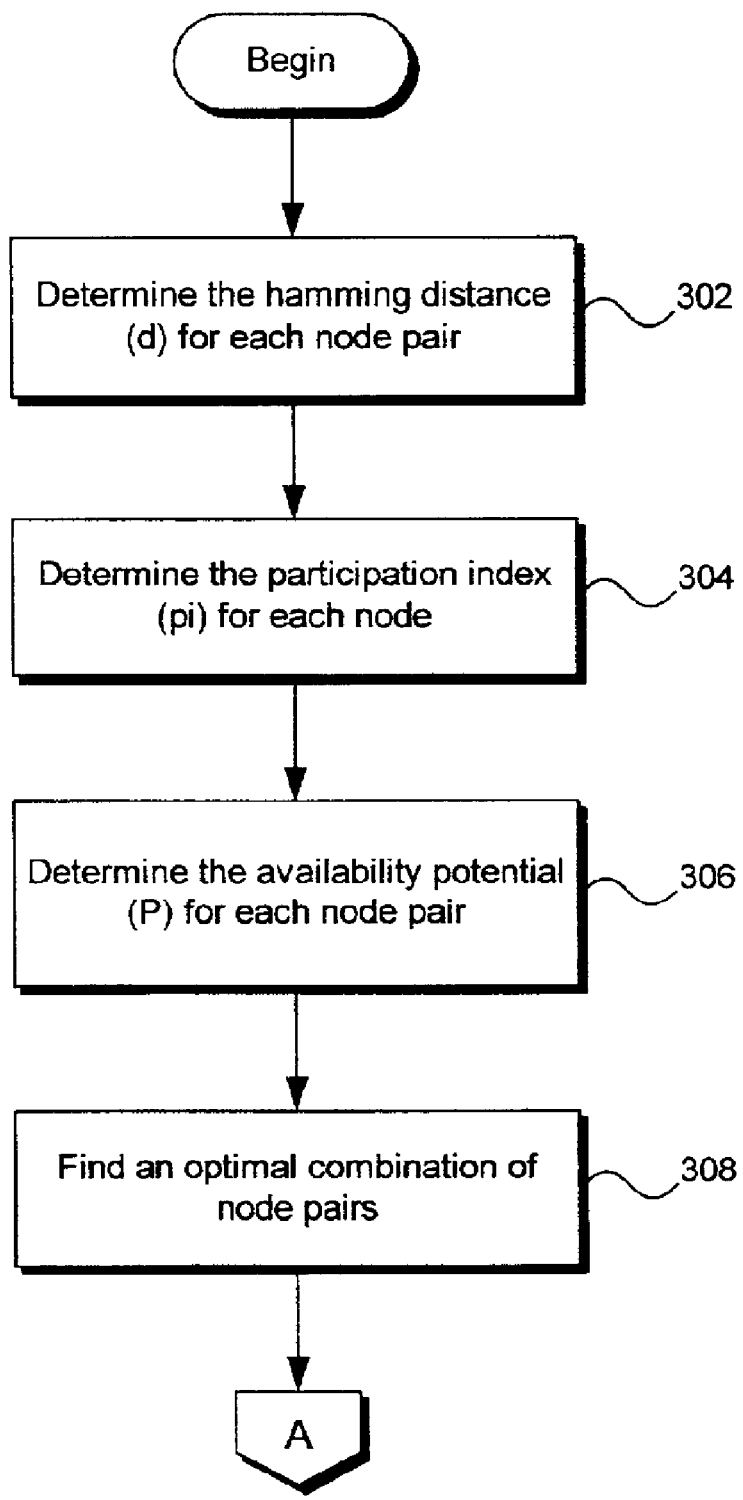
FIG. 3A shows the first phase of a flow chart of an exemplary master node selection algorithm in accordance with the present invention.
Figure 3B:
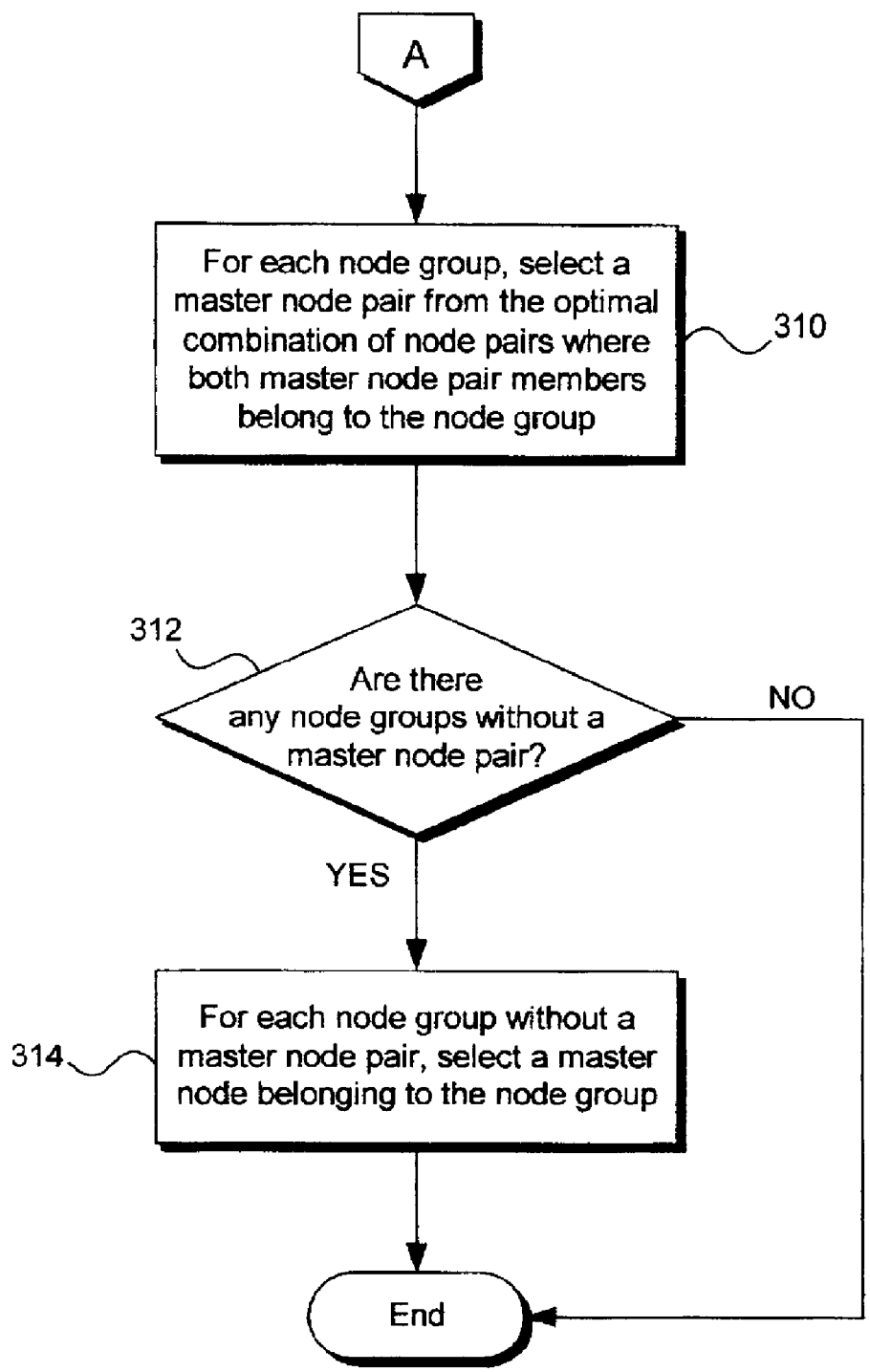
FIG. 3B shows the second phase of a flow chart of an exemplary master node selection algorithm in accordance with the present invention.

In FIGS. 3A and 3B, a flow chart of an exemplary master node selection algorithm in accordance with the present invention is presented. The first phase of the algorithm is shown in FIG. 3A, where nodes are optimally paired based on network configuration information. In the second phase of the algorithm, shown in FIG. 3B, master nodes are elected for each node group. It should be remarked that the logical operations of the algorithm may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The algorithm begins with determining hamming distance operation 302. In this step, the hamming distance (d) of each node pair is calculated. The hamming distance of each node pair in the network is defined as the number of node groups the node pair members do not share in common. For example, referring back to FIG. 2, the node pair (n5, n6) has a hamming distance of 0 since node n5 and node n6 belong to the same node groups. On the hand, the node pair (n5, n10) has a hamming distance of 2 since node n10 belongs to two node groups that n5 does not belong to. Returning back to FIG. 3A, after the hamming distance of each node pair is determined, control is passed to determining participation index operation 304.

In determining participation index operation 304, the participation index (pi) of each node in the network is calculated. The participation index (pi) of each node is calculated by counting the number of node groups the node belongs to. For example, in FIG. 2, node n7 has a participation index of 2 since it belongs to LBG-B and LBG-D. Once the participation index is determined, control is then passed to determining availability potential operation 306.

In determining availability potential operation 306, the availability potential (P) of each node pair is calculated. The availability potential (P) of a node pair is defined as the sum of the participation indexes (pi) of the node pair member subtracted by the hamming distance (d) of the node pair. Since the sum of the participation indexes (pi) of the node pair members provides the total number of node groups the pair belongs to, and the hamming distance (d) provides the number of node groups the node pair members do not share in common, the availability potential (P) of a node pair therefore indicates the number of possible node groups the pair can provide high availability to. Thus, if $pi(n_p)$ is the participation index of node $n_p$, $pi(n_q)$ is the participation index of node $n_q$, and $d(n_p,n_q)$ is the hamming distance of node pair $(n_p,n_q)$, then $(pi(n_p)+pi(n_q)-d(n_p,n_q))/2$ is the potential number node groups the node pair $(n_p,n_q)$ can be masters of. Once the determining availability potential operation 306 is completed, control passes to finding operation 308.

In finding operation 308, an optimal combination of node pairs for the network is found. The optimal combination of node pairs is the combination of node pairs having the maximum total availability potential (P) for the network. In other words, the optimal pairing of nodes is obtained by generating node pairs that maximize the summation $\Sigma(pi-d)$ over all such node pairings. By optimal, it should be understood that the combination of node pairs generated may not necessarily be the only best deployment strategy, but, for a given configuration, a better deployment strategy than that generated by the algorithm cannot be found.

In one embodiment of the invention, the optimal combination of node pairs is obtained by iteratively searching for the maximum total availability potential within a sorted array of node pair availability potentials. Starting with the topmost element in array (which has the highest potential value), the node pairings encountered are recorded along with their availability potential. When all the nodes are accounted for, the total availability potential is compared with the previously calculated total availability potential. If the new total availability potential is higher, the node pair combination is saved as the optimal pairing and is compared with the next node pair combination. The process is repeated until the availability potential of the optimal pair is greater than the highest node pair potential considered multiplied by the total number of nodes. For example, the program pseudo-code for determining the optimal combination of node pairs may be as follows:

```
Maximum_potential = 0;
i = 0;
while (POTENTIAL[i]*NUM_NODES/2 > Maximum_potential AND
        i <= NUM_NODES*(NUM_MODES-1)/2) {
    Total_potential = 0;
    PARTNER[ ] = 0;
    n = 0;
    j = i;
    while (n < NUM_NODES-1 AND j <= NUM_NODES*(NUM_NODES-1)/2) do {
        if (nodes a, b, in element POTENTIAL[j] have not been paired) {
            set PARTNER[a] = b; set PARTNER[b] = a;
            Total_potential = Total_potential + this node pair's
```

```
                potential;
            n = n + 2;
            j = j + 1;
        }
    }
    if (Total_potential > Maximum_potential) {
        Maximum_potential = Total_pontential;
        OPTIMAL_PAIRS[ ] = PARTNER[ ];
    }
    i = i + 1;
}
return (OPTIMAL_PAIRS[ ]);
```

To better illustrate the above process, reference is made to FIGS. 4A–4D, where exemplary data structures used by the master node selection algorithm are shown. In accordance with the present invention, the data structures described below can be any available media that can be accessed by the selection algorithm. In a particular embodiment of the invention, the data structures are embodied as computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the selection algorithm. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media includes wired media such as a wired network or direct-wired connection, and wireless media such as acoustic, RF, infrared and other wireless media. Combinations of any of the above should also be included within the scope of computer readable media.

Figure 4A:
FIG. 4A shows a node group configuration array.

In FIG. 4A, a node group configuration array 402 is shown. The node group configuration array 402 is an m by n array storing the relationships between each node and each node group in the network, where m is the number of node group in the network and n is the number of nodes in the network. In a particular embodiment of the invention, each column in the node group configuration array 402 describes a network node and each row in the node group configuration array 402 describes a network node group. A "1" or a Boolean true value in an array cell indicates that the corresponding node is a member of the corresponding node group, while a "0" or a Boolean false value indicates that the node does not belong to the node group. For example, node n1 is a member of node groups LBG-A, LBG-C, and LBG-D, but not LBG-B and LBG-E.

Figure 4B:
FIG. 4B shows a participation index array.

In FIG. 4B, a participation index array 404 is shown. The participation index array 404 is a one by n array storing the participation index (pi) of each node. As described above, the participation index (pi) is the number of node groups a node belongs to. Thus, each array cell in the participation index array 404 contains the number of 1's appearing along each column corresponding to each node in the node group configuration array 402.

Figure 4C:
FIG. 4C shows a hamming distance array.

In FIG. 4C, a hamming distance array 406 is shown. The hamming distance array 406 is an n by n array storing the hamming distance (d) of each node pair. As discussed above, the hamming distance for a node pair is the number of node groups the node pair members do not share in common. In one embodiment of the invention, the hamming distance is calculated by performing an exclusive OR operation between two columns in the node group configuration array 402 and adding the number of 1's in the result. For example, an XOR operation between columns n1 and n2 in the node group configuration array 402 yields "11010". Adding the 1's in the result provides a hamming distance (d) of 3.

In FIG. 4D, a potential availability array 408 is shown. The potential availability array 408 is an n by n array storing the potential availability (P) of each node pair. As discussed above, the potential availability for a node pair is calculated by adding the participation indexes of the distinct node pair members and subtracting the node pair's hamming distance. Thus, for the node pair (n3, n5), the potential availability is equal to pi(n3)+pi(n5)−d(n3, n5) or 4+4−2.

The potential availability array 408 is utilized to find the optimal combination of node pairs in the network. As discussed above, the optimal combination of node pairs is the combination of node pairs with the maximum total potential availability (P) value. Recall that the node pairs must observe the requirement that if two nodes pair members $N_p$, $N_q$ are elected to be masters of group $G_i$, then neither $N_p$ nor $N_q$ can be a master node of a different node group $G_j$ with a third node $N_r$. Searching through the node pair combination for the maximum total potential availability (P) value yields the optimal node pairing (n3, n4) and (n1, n5), with a total potential availability (P) value of 12. This is the highest value potential availability (P) for the network and, therefore, the optimal combination of node pairs. In one embodiment of the present invention, the optimal combination of node pairs is stored in computer memory.

Returning now to FIGS. 3A and 3B, once the optimal combination of node pairs is found, the master node selection algorithm continues to selecting operation 310, shown in FIG. 3B. In selecting operation 310, each node group is assigned a node pair to be the group's master node pair. The node pair selected must be in the optimal combination of node pairs and both of its node pair members must belong to the node group. Thus, for a given target node group, the master node pair for the target node group must be chosen from the optimal combination of node pairs and both node pair members must belong to the target node group.

For example and referring back to the node group configuration array 402 of FIG. 4A, it was calculated that the optimal combination of node pairs for this network configuration is (n3, n4) and (n1, n5). The only node pair from the optimal combination of node pairs with both node pair members belonging to node group LBG-B is node pair (n3, n4). Therefore, node pair (n3, n4) is selected to be the master node pair of LBG-B. Similarly, node pair (n3, n4) is selected to be the master node pair for LBG-C and LBG-E. As for node group LBG-D, the only node pair from the optimal combination of node pairs with both node pair members belonging to LBG-D is node pair (n1, n5). Thus, node pair (n1, n5) is selected to be the master node pair of LBG-D. Finally, both node pairs (n1, n5) and (n3, n4) may be selected as master node pairs for node group LBG-A since both node pairs have both node pair members belonging to LBG-A. As discussed below, in one embodiment of the invention a preferred selection order is utilized to select a master node pair from a choice of two or more qualifying node pairs.

Returning to FIG. 3B, after selecting operation 310 is completed, control passes to query operation 312. In query operation 312, the algorithm checks if there are any node groups without an assigned master node pair. A target node group may not be assigned a master node pair if there are no node pairs in the optimal combination of node pairs with both node pair members belonging to the target node group. If the query operation 312 determines that all the node groups were assigned master node pairs, then the algorithm ends. If the query operation 312 reports that one or more node groups were not assigned master node pairs, control passes to selecting operation 314.

In selecting operation 314, each node group without an assigned master node pair is assigned a master node. The master node chosen does not have to belong to the optimal combination of node pairs; however, the master node must belong to the target node group. If the target node contains more than one node, any one of these nodes may function as the master node. As discussed below, in one embodiment of the invention a preferred selection order is utilized to select a master node from a choice of nodes belonging to the target node. After every node group without a master node pair is assigned a master node, the algorithm ends.

As mentioned above, in one embodiment of the present invention a preferred order of master node pairs is utilized. When more than one node pair is available to serve as a node group's master node pair, the node pair with the smallest participation index (pi) is chosen as the master node pair. For instance, returning to FIGS. 4A–4D, it was earlier determined that the optimal node pair combination for the network configuration is (n3, n4) and (n1, n5). It was also observed that both node pairs (n3, n4) and (n1, n5) can serve as master node pairs for LBG-A. The participation index (pi) of (n3, n4), i.e. pi(n3)+pi(n4), is 8. Likewise, the participation index (pi) of (n1, n5) is 7. Therefore, the node pair selected as LBG-A's master node pair is node pair (n1, n5) because it has a smaller participation index (pi) than node pair (n3, n4).

In FIG. 4E, a preferred order array 510 is shown. The preferred order array 510 is stored in computer memory and lists the hierarchy of node masters for each node group in the computer network. For example, the preferred order of master nodes for LBG-A is node pair (n1, n5) followed by node pair (n3, n4). Therefore, if node pair (n1, n5) fails, the preferred order array 510 can be utilized to quickly select and appoint node pair (n3, n4) as LBG-A's new master node pair.

In addition to determining a preferred order of master node pairs, a preferred order of master nodes may also be determined using the participation index (pi). Recall that when no node pair can be utilized as a master node pair for a target node group any node belonging to target node group may be selected as the master node. If more than one node is available to serve as a node group's master node, the node with the smallest participation index (pi) is chosen as the master node.

Returning to FIG. 4E, the preferred order for LBG-B, as listed in the preferred order array 510, is node pair (n3, n4), then node n2, followed by node n5. Hence, if master node pair (n3, n4) fails, the next master node selected for LBG-B is node n2. If master node n2 fails, the next master node selected for LBG-B is node n5. It should be noted that the preferred order array 510 may also be used to choose master nodes when nodes go back on-line. For instance, if the master node for LBG-B is n5 when node pair (n3, n4) goes back on-line, the preferred order array 510 can be used to quickly elect node pair (n3, n4) as the new master node pair for LBG-B.

In another embodiment of the invention, the optimal combination of node pairs is arrived at by minimizing the total hamming distance (instead of maximizing the total availability potential) for the network. Thus, this embodiment includes a determining operation to determine a hamming distance for node pairs within the network. Next, an optimal combination of node pairs is found by locating the combination of node pairs with a minimum total hamming distance for the network. A selecting operation selects a master node pair from the optimal combination of node pairs, with the master node pair having both node pair members belonging to the target node group. If a master node pair does not exist for the target node group, a node belonging to the target node group is selected as the master node for the target node group.

The foregoing description of the invention has been presented for purposes of illustration and description. The teachings above may be applied to any group of nodes that are clustered and master nodes have to be selected from a set of overlapping node groups such that 1) the master nodes share membership in the group for which they are elected masters, and 2) the master nodes replicate some state information about the group (by heartbeating or the like). Thus, the above description is not intended to be exhaustive or to limit the invention to the precise form disclosed, and other modifications and variations may be possible. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for selecting master nodes to manage a target node group in a computer network having multiple nodes and node groups, the method comprising:

determining a hamming distance for node pairs within the network, each of the node pairs having two node pair members and the hamming distance being the number of node groups the node pair members do not share in common;

determining a participation index for nodes within the network, the participation index being the number of node groups a node belongs to;

determining an availability potential for the node pairs, the availability potential being the sum of the participation indexes of the node pair members subtracted by the hamming distance of the node pair;

finding an optimal combination of node pairs, the optimal combination of node pairs having a maximum total availability potential for the network;

selecting a master node pair for the target node group, the master node pair being the node pair from the optimal combination of node pairs having both node pair members belonging to the target node group; and if the master node pair does not exist for the target node group, selecting a master node for the target node group, the master node being the node belonging to the target node group.

2. The method of claim 1, wherein either of the node pair members of the master node pair selected for the target node group are not master nodes for another node group with a third node.

3. The method of claim 1, wherein selecting a master node pair for the target node group further includes if the optimal combination of node pairs contains more than one node pair having both node pair members belonging to the target node group, selecting the node pair with the smallest sum of the participation indexes of the node pair members.

4. The method of claim 1, wherein selecting a master node for the target node group further includes if more than one node belongs to the target node group, selecting the node with the smallest participation index.

5. The method of claim 1, wherein determining a hamming distance for node pairs within the network includes XORing the node pair members.

6. In a computer-readable medium having stored thereon a data structure for use in selecting master nodes to manage a target node group in a computer network having multiple nodes and overlapping node groups, the data structure comprising:

a hamming distance array containing, for node pairs in the network, the number of node groups node pair members do not share in common;

a participation index array containing, for nodes in the network, the number of node groups the node belongs to; and an availability potential array containing, for node pairs in the network, the sum of the participation indexes of the node pair members subtracted by the hamming distance of the node pair.

7. The data structure of claim 6, wherein the hamming distance array is an n by n array, where n is the number of nodes in the network.

8. The data structure of claim 6, wherein the participation index array is a one by n array, where n is the number of nodes in the network.

9. The data structure of claim 6, wherein the availability potential array is an n by n array, where n is the number of nodes in the network.

10. The data structure of claim 6, further comprising a node group configuration array storing the relationships between each node and each node group in the network.

11. The data structure of claim 10, wherein the node group configuration array is an m by n array, where m is the number of node groups in the network and n is the number of nodes in the network.

12. The data structure of claim 10, wherein in the node group configuration array a "1" is used to signify the node belonging to the node group and a "0" is used to signify the node not belonging to the node group.

13. The data structure of claim 6, further comprising an optimal combination of node pairs, the optimal combination of node pairs being the combination of node pairs having a maximum total availability potential for the network.

14. The data structure of claim 6, further comprising a preferred order array listing a hierarchy of master node pairs for node groups in the network.

15. The data structure of claim 14, wherein the preferred order array further includes a hierarchy of master nodes for node groups in the network.

16. A computer program product embodied in a computer storage media comprising:

computer readable program codes coupled to the computer storage media for selecting master nodes to manage a target node group in a computer network having multiple nodes and node groups, the computer readable program codes comprising:

first computer readable program code configured to cause the program to determine a hamming distance for node pairs within the network, the node pair having two node pair members and the hamming distance being the number of node groups the node pair members do not share in common;

second computer readable program code configured to cause the program to determine a participation index for nodes within the network, the participation index being the number of node groups a node belongs to;

third computer readable program code configured to cause the program to determine an availability potential for each node pair, the availability potential being the sum of the participation indexes of the node pair members subtracted by the hamming distance of the node pair;

fourth computer readable program code configured to cause the program to find an optimal combination of node pairs, the optimal combination of node pairs having the maximum total availability potential for the network; and fifth computer readable program code configured to cause the program to select a master node pair for the target node group, the master node pair being the node pair from the optimal combination of node pairs having both node pair members belonging to the target node group; and if the master node pair does not exist for the target node group, sixth computer readable program code configured to cause the program to select a master node for the target node group, the master node being the node belonging to the target node group.

17. The computer program product of claim 16, wherein the computer storage media comprises a magnetic disk.

18. The computer program product of claim 16, wherein the computer storage media comprises an optical disk.

19. The computer program product of claim 16, wherein the computer storage media comprises a random access memory device.

20. A system for selecting master nodes to manage a target node group in a computer network having multiple nodes and node groups, the system comprising:

a computer storage media having stored thereon the following, a hamming distance module for determining a hamming distance of node pairs within the network, each of the node pairs having two node pair members and the hamming distance being the number of node groups the node pair members do not share in common;

a participation index module for determining a participation index of nodes within the network, the participation index being the number of node groups a node belongs to;

an availability potential module for determining an availability potential of the node pairs, the availability potential being the sum of the participation indexes of the node pair members subtracted by the hamming distance of the node pair;

a search module for finding an optimal combination of node pairs, the optimal combination of node pairs having the maximum total availability potential for the network;

a first selection module for selecting a master node pair of the target node group, the master node pair being the node pair from the optimal combination of node pairs having both node pair members belonging to the target node group; and a second selection module for selecting a master node for the target node group if the master node pair does not exist for the target node group, the master node being the node belonging to the target node group.

21. The system of claim 20, wherein the node pair members of the master node pair selected for the target node group are not master nodes for another node group with a third node.

22. The system of claim 20, wherein the first selection module further includes if the optimal combination of node pairs contains more than one node pair having both node pair members belonging to the target node group, selecting the node pair with the smallest sum of the participation indexes of the node pair members.

23. The system of claim 20, wherein the second selection module further includes if more than one node belongs to the target node group, selecting the node with the smallest participation index.

24. The system of claim 20, wherein the hamming distance module includes XORing the node pair members.

25. A method for selecting master nodes to manage a target node group in a computer network having multiple nodes and node groups, the method comprising:

determining a hamming distance for node pairs within the network, each of the node pairs having two node pair members and the hamming distance being the number of node groups the node pair members do not share in common;

finding an optimal combination of node pairs, the optimal combination of node pairs having a minimum total hamming distance for the network;

selecting a master node pair for the target node group, the master node pair being the node pair from the optimal combination of node pairs having both node pair members belonging to the target node group; and if the master node pair does not exist for the target node group, selecting a master node for the target node group, the master node being the node belonging to the target node group.

26. The method of claim 25, wherein either of the node pair members of the master node pair selected for the target node group are not master nodes for another node group with a third node.

27. The method of claim 25, wherein selecting a master node pair for the target node group further includes:

determining a participation index for nodes within the network, the participation index being the number of node groups a node belongs to; and if the optimal combination of node pairs contains more than one node pair having both node pair members belonging to the target node group, selecting the node pair with the smallest sum of the participation indexes of the node pair members.

28. The method of claim 25, wherein selecting a master node for the target node group further includes:

determining a participation index for nodes within the network, the participation index being the number of node groups a node belongs to; and if more than one node belongs to the target node group, selecting the node with the smallest participation index.

29. The method of claim 25, wherein determining a hamming distance for node pairs within the network includes XORing the node pair members.

* * * * *

UNITED STATES PATENT AND TRADEMARK OFFICE
CERTIFICATE OF CORRECTION

PATENT NO. : 6,950,855 B2　　　　　　　　　　　　　　　　　　　　　　　　　Page 1 of 1
DATED : September 27, 2005
INVENTOR(S) : Sampathkumar It is certified that error appears in the above-identified patent and that said Letters Patent is hereby corrected as shown below:

<u>Column 9,</u>
Line 37, "target node contains" should be -- target node group contains --.
Line 42, "node. After" should be -- node group. After --.

Signed and Sealed this

Thirteenth Day of December, 2005

JON W. DUDAS
*Director of the United States Patent and Trademark Office*